United States Patent [19]

Satoh et al.

[11] Patent Number: 4,682,258

[45] Date of Patent: Jul. 21, 1987

[54] VIDEO CASSETTE CARTRIDGE CONSTRUCTION

[75] Inventors: Takateru Satoh, Saku; Haruo Shiba, Komoro; Eiichi Nunokawa, Saku, all of Japan

[73] Assignee: TDK Corporation, Tokyo, Japan

[21] Appl. No.: 669,403

[22] Filed: Nov. 8, 1984

[30] Foreign Application Priority Data

Nov. 10, 1983 [JP] Japan .............................. 58-173153[U]

[51] Int. Cl.⁴ .......................... G11B 23/04; G03B 1/04
[52] U.S. Cl. ..................................... 360/132; 242/199
[58] Field of Search ............. 360/132, 130.31–130.33, 360/130.2, 130.21; 242/197, 199; 206/387

[56] References Cited

U.S. PATENT DOCUMENTS 4,108,398 8/1978 Hashimoto et al. ................ 242/199
4,231,532 11/1980 Popov et al. ....................... 242/199

Primary Examiner—Stuart N. Hecker
Assistant Examiner—Benjamin E. Urcia
Attorney, Agent, or Firm—Seidel, Gonda, Goldhammer & Abbott

[57] ABSTRACT

A tape cassette including a housing of two sections joined with a magnetic tape inside has in its front wall a center opening for magnetic head and two openings for capstan insertion, each housing section having a U-shaped guide joined to a partition behind one capstan opening. In each housing section the U-shaped guide has a pair of guide ribs formed on the opening side and having a height greater than the tape width, and a wall supporting the rear portions of the guide ribs and partitions formed at the rear of the center opening and the other opening are all formed to a height about half that of the guide ribs.

3 Claims, 4 Drawing Figures

VIDEO CASSETTE CARTRIDGE CONSTRUCTION

BACKGROUND OF THE INVENTION

This invention relates to a magnetic tape cassette, and more particularly to a tape cassette of a structure with improved dimensional accuracy.

Cassettes of this character are generally manufactured by forming upper and lower housing sections (or halves) by injection molding, fitting a pair of tape-winding hubs, a length of magnetic tape wound on the hubs, guide rollers, a seperator sheet, magnetic head pad and spring, and other necessary components into the housing space, and then joining the two housing sections along their peripheral walls adapted to mate together by setscrews. The upper and lower housing sections are configured in a complementary manner so that when they are united all their portions combine to give a complete assembled structure as designed. Usually, the upper and lower housing sections of magnetic tape cassettes have symmetrically shaped front wall regions. FIGS. 1 and 2 illustrate the lower housing section of such a tape cassette having in the center of the front wall an opening 3 into which the magnetic head of a recorder not shown is to enter. Two more openings 5, 7 for pinch roller insertion are formed adjacent and symmetrically with respect to the head opening in the front center. One opening 5 is provided with a tape guide 9 generally U-shaped as viewed from above. The tape guide 9 includes guide ribs 9', 9" adapted to contact the tape. As shown in FIG. 2, the guide and ribs 9, 9', 9" have height greater than the width of the tape. At the rear of the magnetic head opening 3, there is formed a horizontally extending portion 11 of a given height, about halfway the height of the guide 9 to shield and protect the internal enclosure of the housing. The front wall of the upper housing section is likewise configured so that, when the upper and lower sections are joined together, the space behind the opening 7 is enclosed by the tape guide of the upper section (corresponding to the guide 9 of the lower section). Similarly, the back space of the center opening 3 is enclosed by the partition of the upper section (corresponding to the partition 11). There are also provided an opening 13 for a pinch roller, a positioning opening 15, and a pair of guide rollers 17.

The upper and lower housing sections of the construction described above frequently pose the problem of inadequate dimensional accuracy due to strains developed on injection molding. The inability of assuring constant dimensional accuracy is even more serious in these days when there is growing demand for higher performance recording and playback with magnetic tapes driven at lower speeds than heretofore.

Our investigations on the cause of the trouble have now revealed that the trouble stems from the fact that the back walls of the left and right openings adjacent the center opening have a substantial difference in height. At the rear of the left opening the guide 9 stands high, whereas the right opening is not backed by such a member. This can result in a material difference in friction resistance between the molded upper and lower housing sections at the time of their release from the dies. This dissimilarity in friction resistance, in turn, is likely to give unbalanced, defective moldings. A more important problem is a wide difference in mold shrinkage factor between the left and right openings which leads to permanent strains and reduced accuracy. The assembled product will have unbalanced strength between the left and right half portions, the right opening region being the weakest.

These configurations of the prior art have been possible causes of misalignment of the tape with the magnetic head of the recorder on which the cassette is used and hence of output drop or variation, phase mismatching, and other troubles.

SUMMARY OF THE INVENTION

This invention has for its object the provision of a magnetic tape cassette, especially a housing therefor, which has a minimum of molding strains and is readily released from the dies with high strength and particularly good dimensional accuracy.

The invention provides a magnetic tape cassette using a housing of a type which comprises upper and lower housing sections molded from plastics and joined so that the front wall of the housing has a center opening for admitting the magnetic head of a recorder and two openings for pinch roller insertion formed adjacent and on both sides of the center opening, characterized in that each housing section has a guide generally U-shaped as viewed from above and associated with one of the pinch roller openings, with two tape-contacting guide ribs having a height greater than the width of the magnetic tape, while the back wall of the guide has a height about half the rib height, and the partitions of the same height as the back wall are formed at the rear of the center opening and the other adjacent opening. The construction according to the invention settles the problems of the prior art and provides a magnetic tape cassette with high dimensional accuracy.

DESCRIPTION OF THE PREFERRED EMBODIMENT

Figure 1:
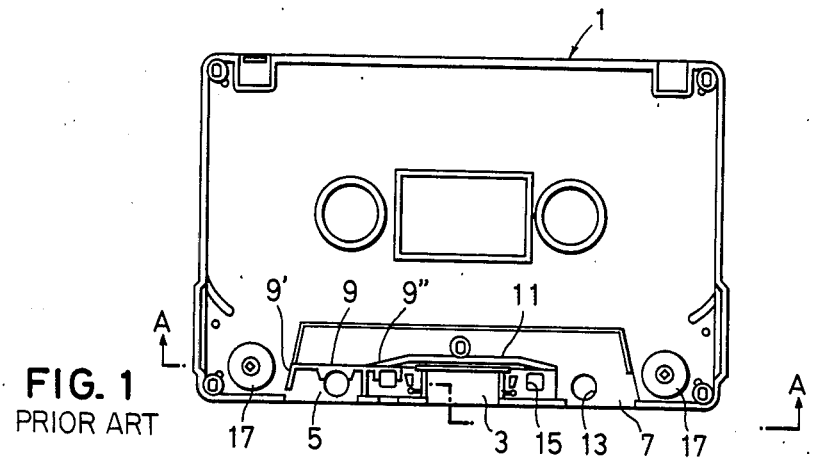
FIG. 1 is a plan view showing the interior of the lower housing section of a conventional magnetic tape cassette.
Figure 2:
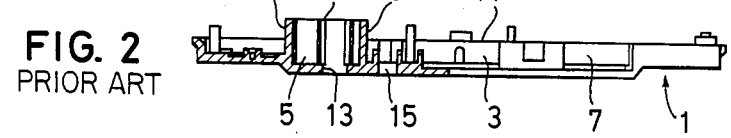
FIG. 2 is a sectional view taken on the line A—A of FIG. 1.
Figure 3:
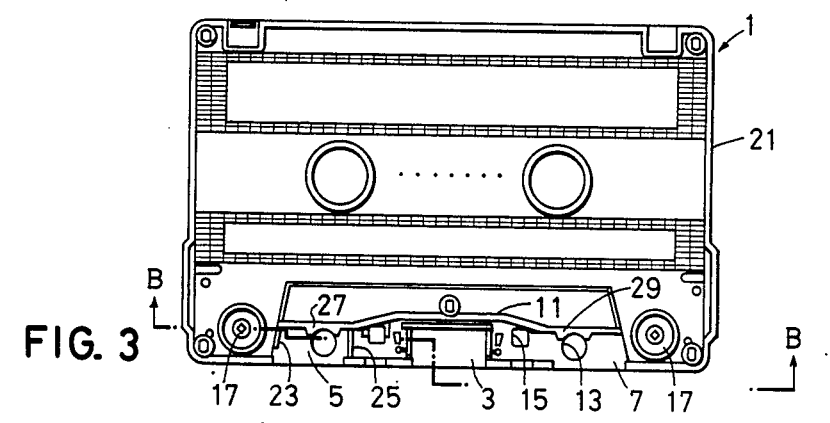
FIG. 3 is a plan view showing the interior of the lower housing section of a magnetic tape cassette embodying the present invention.
Figure 4:
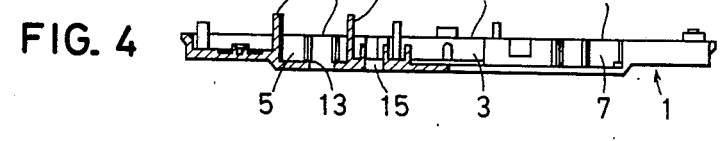
FIG. 4 is a sectional view taken on the line B—B of FIG. 3.

FIGS. 3 and 4 illustrate the lower housing section of a tape cassette embodying the invention. Except for a few particulars, the upper housing section is configured to the same size and shape as the lower one, and the two halves are joined, inside to inside, in a complementary manner to give a complete cassette assembly. Above all, the two are deemed to have identical front designs. Therefore, only the lower housing section will be hereinafter described in detail. In FIGS. 3 and 4 the parts essentially the same as the counterparts in FIGS. 1 and 2 are given like numbers.

The front wall of the lower housing section 1 of the embodiment has an opening 3 in the center into which the magnetic head of a recorder is to enter and two openings 5 and 7 for pinch roller insertion formed adjacent and on both sides of the center opening. Behind the center opening 3 extends a partition 11 of the same height as the peripheral walls 21 of the housing section. Two guide ribs 23, 25 having a height greater than the width of the magnetic tape stand vertically along the left opening 5. The front ends of these guide ribs, of course, are straight and aligned to provide guide planes for the magnetic tape. The rear ends of the guide ribs 23, 25 are joined to, and supported by, a vertical guide support wall 27. The support wall 27 has a height about half that of the guide ribs 23, 25. In the illustrated embodiment it has the same height as, and is integrally joined to, the partition 11. Also, at the rear of the opening 7 is formed vertically a partition 29 of the same height as the partition 11.

The front structure of the upper housing section (not shown) is essentially the same as that of the lower section. As the two halves are mated together, the guide ribs of the upper housing section (corresponding to the ribs 23, 25) gain entrance into the opening 7 of the lower section to provide guides. At the same time, the guide support wall of the upper section (corresponding to 27) abuts on the partition 29 of the lower section, and likewise the partitions of the upper section (corresponding to 11, 29) abuts, respectively, on the partition 11 and the guide support wall 27 of the lower section. The housing assembled in this way functions as satisfactorily as ordinary housings.

The upper and lower housing sections built in the manner described are reinforced with the guide support wall 27 and partitions 11 and 29 enclosing, respectively, the rear spaces of the openings 5, 3, 7. Consequently, the two molded housing sections attain increased strength. Moreover, the support wall and partitions 27, 11, 29 maintain an adequate balance between the left and right portions of the housing, equalizing the thermal shrinkage and minimizing the warpage on molding. The good lateral balance permits the housing sections to come out smoothly and evenly from the dies with consequent reduction in the number of defective products. These upper and lower housing sections provide an excellent magnetic tape cassette with markedly improved dimensional accuracy over the conventional products.

What is claimed is:

1. A tape cassette including an upper housing section and a lower housing section joined along peripheral meeting walls to provide a housing accommodating a magnetic tape therein, the front wall of the assembled housing having a central opening for the magnetic head of a recorder to gain entrance thereinto, two capstan openings for capstan insertion, and two pinch guide openings for pinch guide insertion, one pinch guide opening formed adjacent either side of the central opening, characterized in that said lower housing section is provided in only one of said pinch guide openings with a pair of upstanding tape guide ribs, each of said guide ribs having a front section projecting a height greater than the width of the magnetic tape and a rear section joined to and supporting the front section of said guide ribs and having a height half the height of said front section of said guide ribs, said upper housing section is provided in the other of said pinch guide openings with a pair of similarly formed tape guide ribs, and both said housing sections are provided with partition walls at positions corresponding to and in engagement with the rear section of said respective guide ribs whereby the mating housing sections provide a magnetic tape cassette with improved dimensional accuracy and ease of mold removal during formation.

2. A tape guide cassette including an upper housing section and a lower housing section joined along peripheral mating walls to provide a housing accommodating a magnetic tape therein, the front wall of the assembled housing having a central opening for the magnetic head of a recorder to gain entrance thereinto, two openings for capstan insertion one formed adjacent and on either side of the central opening, and a pinch guide opening on either side of the central opening for pinch guide insertion, said lower housing section being provided in the region of only one of said pinch guide openings with a pair of upstanding tape guide ribs, each of said guide ribs having a front section projecting a height greater than the width of the magnetic tape and a rear section joined to and supporting the front section of said guide ribs, said rear section having a height substantially less than the height of the front section of said guide ribs, said lower housing section being provided with a partition wall having a height substantially the same as the height of said rear section of said guide ribs, said upper housing section being provided with similarly formed tape guide ribs and a similarly formed partition wall, whereby the partition wall of each housing section in the region of a pinch guide opening is aligned with the rear section of said guide ribs of the other housing section in the region of the same pinch guide opening and whereby the mating housing sections provide a magnetic tape cassette with improved dimensional accuracy and ease of mold removal during formation.

3. A tape cassette according to claim 2 wherein the height of said rear section of said guide support ribs is approximately one-half the height of said front section of said tape guide ribs.

* * * * *